United States Patent
Higashi et al.

(10) Patent No.: US 8,662,240 B2
(45) Date of Patent: Mar. 4, 2014

(54) STEERING SYSTEM

(71) Applicant: JTEKT Corporation, Osaka (JP)

(72) Inventors: Masayasu Higashi, Kashihara (JP); Takeshi Watanabe, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/721,743

(22) Filed: Dec. 20, 2012

(65) Prior Publication Data

US 2013/0161117 A1 Jun. 27, 2013

(30) Foreign Application Priority Data

Dec. 26, 2011 (JP) ................................. 2011-283514

(51) Int. Cl.
*B62D 5/00* (2006.01)

(52) U.S. Cl.
CPC ...................................... *B62D 5/008* (2013.01)
USPC ......................................................... 180/402

(58) Field of Classification Search
USPC ............................ 180/402, 444, 446; 257/254
See application file for complete search history.

(56) References Cited

U.S. PATENT DOCUMENTS

| | | | |
|---|---|---|---|
| 7,207,411 B2 * | 4/2007 | Duits et al. | 180/402 |
| 2004/0013334 A1 | 1/2004 | Landrieve et al. | |
| 2012/0062245 A1 * | 3/2012 | Bao et al. | 324/661 |

FOREIGN PATENT DOCUMENTS

| | | | |
|---|---|---|---|
| JP | A-10-278826 | | 10/1998 |
| JP | 2001114123 A | * | 4/2001 |
| JP | A-2001-114123 | | 4/2001 |
| WO | WO 2012/086502 A1 | | 6/2012 |

OTHER PUBLICATIONS

Extended European Search Report issued in European Application No. 12198843.0 dated Apr. 10, 2013.

\* cited by examiner

*Primary Examiner* — J. Allen Shriver, II
*Assistant Examiner* — Felicia L Brittman
(74) *Attorney, Agent, or Firm* — Oliff PLC

(57) ABSTRACT

A steering system includes: an operation mechanism that includes an operation member used to perform a steering operation; and a steered mechanism that is not mechanically coupled to the operation mechanism, and that steers a wheel based on the steering operation of the operation member. The operation mechanism includes a steering angle sensor that detects a steering angle of the operation member, and steering direction detection unit that detects only a steering direction of the operation member.

9 Claims, 4 Drawing Sheets

STEERING SYSTEM

INCORPORATION BY REFERENCE

The disclosure of Japanese Patent Application No. 2011-283514 filed on Dec. 26, 2011 including the specification, drawings and abstract, is incorporated herein by reference in its entirety.

BACKGROUND OF THE INVENTION

1. Field of the Invention

The invention relates to a steer-by-wire steering system.

2. Description of Related Art

In a vehicle steering system that is described in Japanese Patent Application Publication No. 2001-114123 (JP 2001-114123 A) as a steer-by-wire steering system, a rotating operation member and wheels are not mechanically coupled to each other. A steering actuator, which is controlled on the basis of a rotating operation amount of the rotating operation member, steers the wheels. In the above-described steer-by-wire steering system, a configuration for detecting the rotation of the rotating operation member is important. When a malfunction occurs in the above-described configuration, steering is disabled even if the steering actuator is properly operable. In the configuration for detecting the rotation of the rotating operation member, which is described in JP 2001-114123 A, only one angle sensor is provided. In a steering system described in Japanese Patent Application Publication No. 10-278826 (JP 10-278826 A), in order to increase the redundancy of the above-described configuration, a main steering angle sensor and a backup steering angle sensor are provided. Therefore, with the steering system described in JP 10-278826 A, even if a malfunction occurs in the main steering angle sensor, it is possible to continue steering with the use of the backup steering angle sensor.

In the steering system described in JP 10-278826 A, the two identical steering angle sensors are provided in order to make it possible to continue steering even if a malfunction occurs in one of the steering angle sensors. As a result, the number of components and the cost are unnecessarily increased.

SUMMARY OF THE INVENTION

It is an object of the invention to provide a steer-by-wire steering system with a configuration that allows continuation of steering even in the event of a malfunction in a steering angle sensor, and that is implemented without increases in the number of components and the cost.

An aspect of the invention relates to a steering system, including: an operation mechanism that includes an operation member used to perform a steering operation; and a steered mechanism that is not mechanically coupled to the operation mechanism, and that steers a wheel based on the steering operation of the operation member. The operation mechanism includes a steering angle sensor that detects a steering angle of the operation member, and a steering direction detection unit that detects only a steering direction of the operation member.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
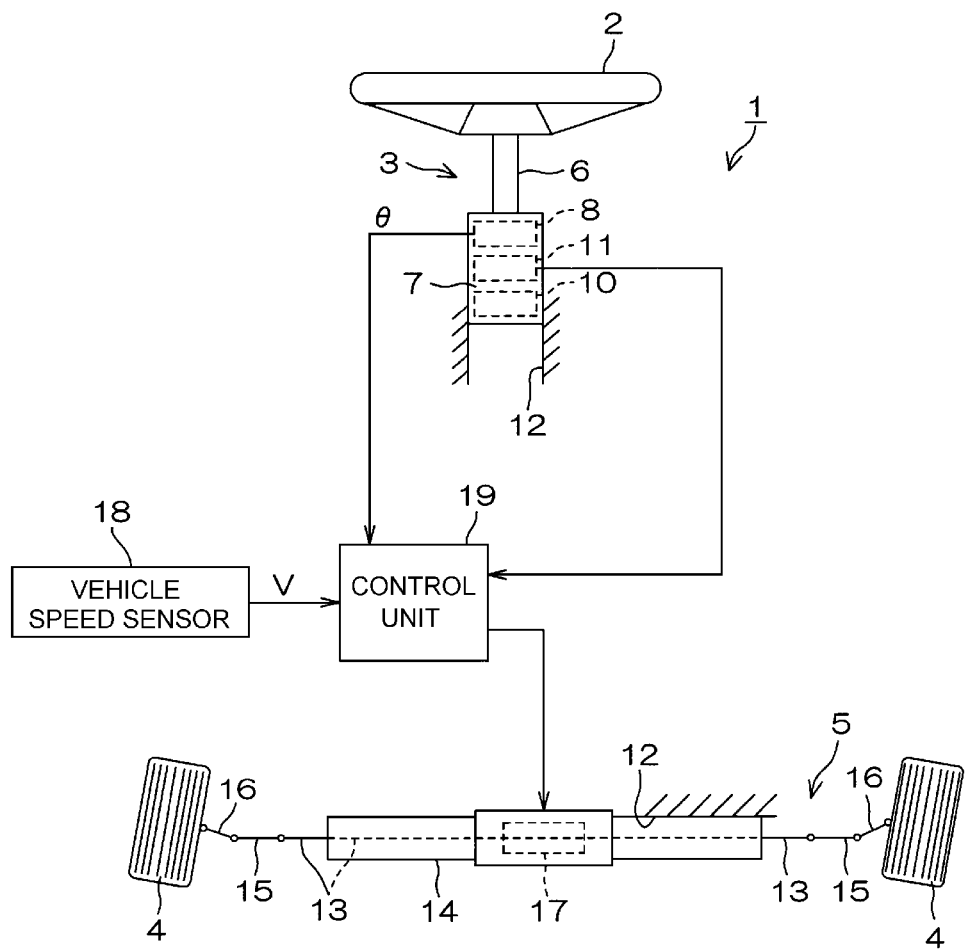
FIG. 1 is a schematic view that shows the schematic configuration of a steering system according to an embodiment of the invention.

An embodiment of the invention will be described with reference to the accompanying drawings. FIG. 1 is a schematic view that shows the schematic configuration of a steering system 1 according to an embodiment of the invention. As shown in FIG. 1, the steering system 1 is applied to a vehicle. The steering system 1 includes an operation mechanism 3 and a steered mechanism 5. The operation mechanism 3 includes a rotatable operation member 2, such as a steering wheel. The steered mechanism 5 steers wheels 4 in response to a steering operation of the operation member 2. The steering system 1 is a so-called steer-by-wire steering system, and the operation mechanism 3 and the steered mechanism 5 are not mechanically coupled to each other.

The operation mechanism 3 mainly includes a rotary shaft 6, a housing 7, a steering angle sensor 8, a reaction force generation unit 10, and a steering direction detection unit 11, in addition to the operation member 2. The rotary shaft 6 extends from the rotation center of the operation member 2. The rotary shaft 6 is rotatably supported by the housing 7. The steering direction detection unit 11 is an example of a steering direction detection unit. The rotary shaft 6 is fixed to the operation member 2. Thus, the operation member 2 and the rotary shaft 6 are rotatable together with each other about the central axis of the rotary shaft 6. Therefore, the angle by which the operation member 2 is rotated (which is referred to as "steering angle") is equal to the rotation angle of the rotary shaft 6.

The housing 7 is a hollow cylindrical member that is fixed to a vehicle body 12, and part of the rotary shaft 6 (part on the opposite side of the rotary shaft 6 from the operation member 2) is accommodated in a hollow portion of the housing 7. The steering angle sensor 8 is, for example, a resolver, a rotary encoder, or the like, and detects the rotation angle of the rotary shaft 6 (i.e., the steering angle θ of the operation member 2). In this specification, the rotation angle (steering angle) is a vector that includes a rotation amount of the rotary shaft 6 and operation member 2 (an operation amount of the operation member 2) and a rotation direction of the rotary shaft 6 and operation member 2 (a steering direction of the operation member 2). The steering angle sensor 8 is accommodated in the housing 7.

The reaction force generation unit 10 applies resistance to the rotation of the rotary shaft 6 by rubbing against the rotary shaft 6. The resistance is applied to the operation member 2 as a steering reaction force. The steering reaction force applied to the operation member 2 allows a user who operates the operation member 2 to simulatively experience reaction force that the wheels 4 receive from a road surface. The reaction force generation unit 10 is accommodated in the housing 7. The steering direction detection unit 11 is used to detect only the steering direction of the operation member 2, and will be described in detail later.

The steered mechanism 5 mainly includes a steered shaft 13, a housing 14, tie rods 15, knuckle arms 16 and a steered system actuator 17. The steered shaft 13 is a shaft member that extends in the width direction (vehicle width direction, and lateral direction in FIG. 1) of the vehicle body 12. The housing 14 is a hollow member that extends in the vehicle width direction, and the steered shaft 13 is passed through a hollow portion of the housing 14. In this state, both end portions of the steered shaft 13 in the axial direction (which coincides with the vehicle width direction) are exposed on the outside of the housing 14. The steered shaft 13 is slidable in the vehicle width direction.

Each of the tie rods 15 is coupled to a corresponding one of the axial end portions of the steered shaft 13. Each of the knuckle arms 16 is coupled to an end portion of a corresponding one of the tie rods 15 at a portion on the opposite side of the tie rod 15 from a portion coupled to the steered shaft 13. The wheels 4 are coupled to the respective knuckle arms 16. The steered system actuator 17 includes, for example, an electric motor (not shown) and a ball screw device (not shown). The ball screw device converts the driving force of the electric motor (the rotational force of an output shaft of the electric motor) into an axial sliding motion of the steered shaft 13. When the electric motor (not shown) of the steered system actuator 17 generates driving force, the steered shaft 13 slides in the vehicle width direction. The sliding motion is transmitted to the tie rods 15 at respective axial end portions of the steered shaft 13. As a result, the knuckle arms 16 pivot, and the wheels 4 are steered.

Although FIG. 1 shows a state where the wheels 4 are steered slightly to the right, the position (position in the rotation direction) of the operation member 2, which corresponds to the position of the wheels 4 at the time when the vehicle is travelling straight ahead, is the steering neutral position. The steering system 1 further includes a vehicle speed sensor 18 and a control unit 19. The vehicle speed sensor 18 detects a vehicle speed V. Detection signals from the steering angle sensor 8, the steering direction detection unit 11 and the vehicle speed sensor 18 are input into the control unit 19. The control unit 19 is also called an electronic control unit (ECU), and is formed of a microcomputer.

Figure 2:
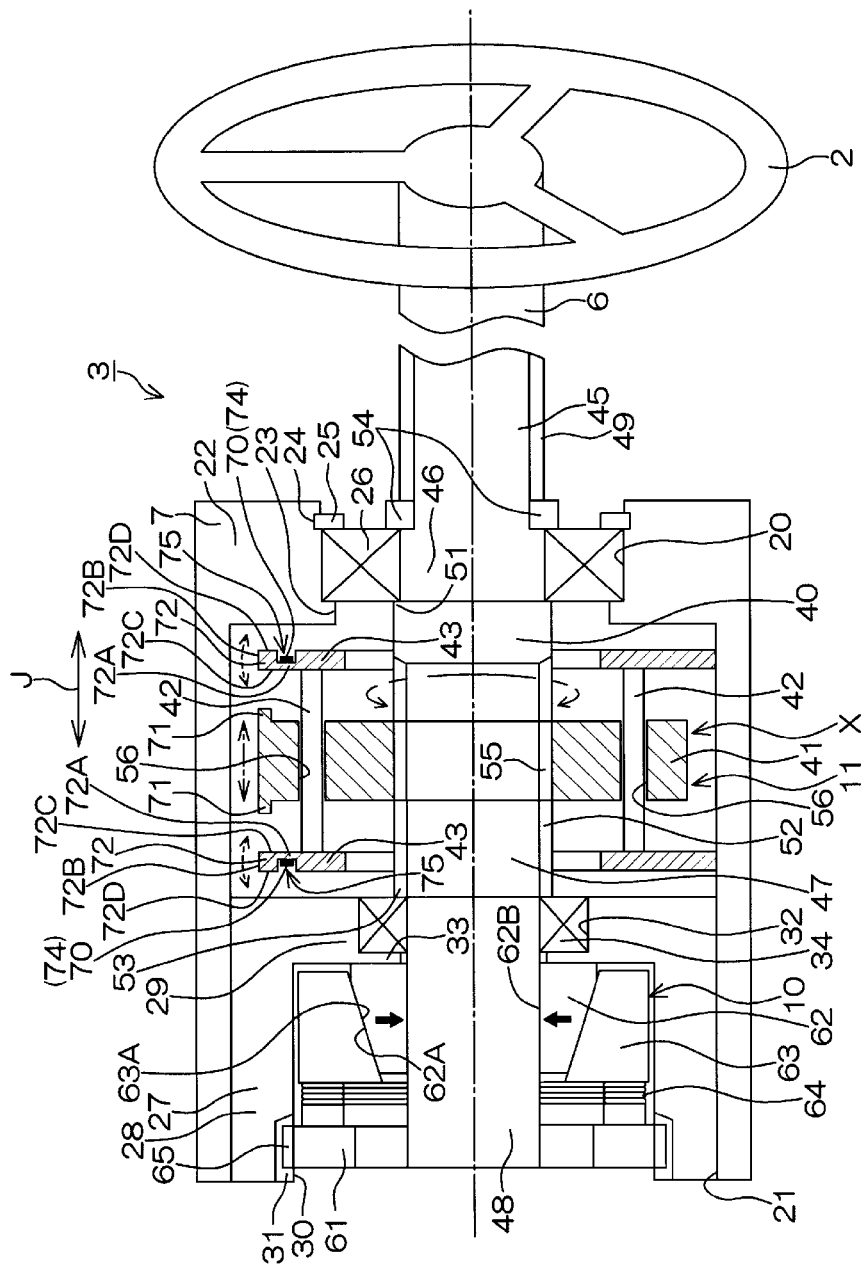
FIG. 2 is a schematic sectional view that shows an operation mechanism that is extracted from the steering system.
Figure 3:
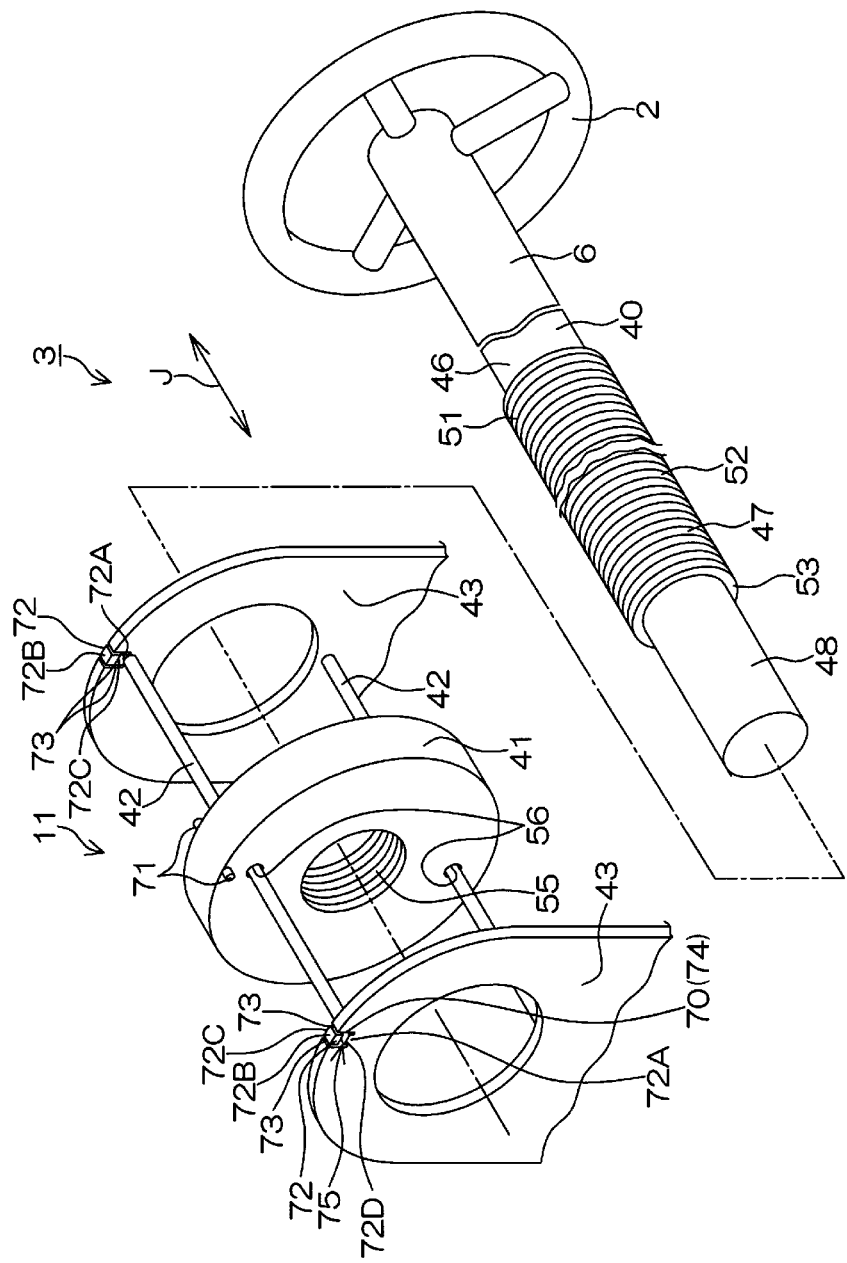
FIG. 3 is an exploded perspective view of main portions of the operation mechanism.

When the vehicle normally starts moving or is normally travelling, the control unit 19 sets a target steered angle on the basis of the steering angle θ detected by the steering angle sensor 8 and the vehicle speed V detected by the vehicle speed sensor 18. The control unit 19 executes drive control on the steered system actuator 17 such that the wheels 4 are steered to the target steered angle. FIG. 2 is a schematic sectional view that shows the operation mechanism 3 that is extracted from the steering system 1. FIG. 3 is an exploded perspective view of main portions of the operation mechanism 3.

Next, the operation mechanism 3, particularly, the steering direction detection unit 11, will be described in detail with reference to FIG. 2 and FIG. 3. Note that, in FIG. 2, the steering angle sensor 8 is not shown. The following description will be provided on the assumption that the wheels 4 (see FIG. 1) are steered to the right when the operation member 2 shown in FIG. 2 is rotated in the clockwise direction and the wheels 4 are steered to the left when the operation member 2 is rotated in the counterclockwise direction.

In the operation mechanism 3, the above-described housing 7 extends in the lateral direction in FIG. 2. In the housing 7, a round first end opening 20 is formed in a first end face in the lateral direction (right end face in FIG. 2), and a round second end opening 21 is formed in a second end face in the lateral direction (left end face in FIG. 2). The hollow portion of the housing 7 communicates with the outside of the housing 7 via the first end opening 20 and the second end opening 21.

In the housing 7, a portion that defines the first end opening 20 is a flange 22 that forms a slightly thick annular plate. On the inner periphery of the flange 22, a positioning protrusion 23 that protrudes radially inward is formed integrally with the flange 22 at an end portion that is farthest from the outside of the housing 7 (a leftmost portion in FIG. 2). In addition, on the inner periphery of the flange 22, an annular groove 24 that is recessed radially outward and that extends along the whole circumference of the flange 22 is formed at an end portion that is closest to the outside of the housing 7 (a rightmost portion in FIG. 2). An annular or C-shaped positioning ring 25 is fitted into the annular groove 24 from the radially inner side. An annular bearing 26 is coaxially fitted to the first end opening 20. The bearing 26 is positioned with respect to the housing 7 by being held by the positioning protrusion 23 and the positioning ring 25 from respective sides.

A holder 27 is accommodated in the hollow portion of the housing 7 in a region on the opposite side from the flange 22. The holder 27 has a hollow cylindrical shape that is coaxial with the housing 7. A first axial end of the holder 27 is closed, and a second axial end of the holder 27 is open. The holder 27 has a cylindrical peripheral wall 28 and a disc-shaped end wall 29, which are formed integrally with each other and which are located in the housing 7. The cylindrical peripheral wall 28 has an outside diameter that is substantially equal to the inside diameter of a portion of the housing 7, other than the flange 22. The end wall 29 is coupled to a first axial end of the cylindrical peripheral wall 28.

The holder 27 is fitted into the housing 7 through the second end opening 21. The end wall 29 of the holder 27 is located closer to the first end opening 20 (right side in FIG. 2) of the housing 7 than the other portion of the holder 27. By connecting the outer periphery of the cylindrical peripheral wall 28 to the inner periphery of the housing 7, the holder 27 is fixedly coupled to the housing 7, and becomes part of the housing 7. An opening 30 is defined by a second axial end of the cylindrical peripheral wall 28, the second axial end being on the opposite side of the cylindrical peripheral wall 28 from a portion to which the end wall 29 is coupled. The opening 30 is located at the same position in an axial direction J (the axial direction of the housing 7 and the holder 27) as the second end opening 21 of the housing 7. The hollow portion of the holder 27 communicates with the outside of the housing 7 via the opening 30 and the second end opening 21. A threaded portion 31 is formed in the inner periphery of the cylindrical peripheral wall 28, in a region around the opening 30.

A round shaft insertion hole 32 is formed at the circle center position of the end wall 29. The round shaft insertion hole 32 passes through the end wall 29 in the thickness direction (axial direction J). A portion of the end wall 29, which defines the shaft insertion hole 32, forms the inner periphery of the end wall 29. On the inner periphery of the end wall 29, a positioning protrusion 33 that protrudes radially inward is formed integrally with the end wall 29, at an end portion on the opening 30 side (left end portion in FIG. 2). An annular bearing 34 is coaxially fitted into the shaft insertion hole 32. The bearing 34 is positioned with respect to the housing 7 by bringing the positioning protrusion 33 into contact with the bearing 34 from the opening 30 side (left side in FIG. 2).

The steering direction detection unit 11 includes a threaded shaft 40, a nut 41, nut guides 42, stoppers 43, and a contact detection sensor 70. The contact detection sensor 70 is an example of a contact detection unit. The threaded shaft 40 is a shaft member, and is coaxially coupled to the rotary shaft 6.

The threaded shaft 40 and the rotary shaft 6 may be formed integrally with each other or may be formed so as to be detachable from each other. The threaded shaft 40 has a first thread forming portion 45, a first support portion 46, a second thread forming portion 47 and a second support portion 48, which are formed integrally with each other and arranged in this order from the rotary shaft 6 side.

A threaded portion 49 is formed on the outer periphery of the first thread forming portion 45. The outer periphery of the first support portion 46 is an even peripheral face. The first support portion 46 has substantially the same diameter as the first thread forming portion 45. The second thread forming portion 47 is slightly larger in diameter than the first support portion 46. Therefore, a step 51 is formed at an end portion of the second thread forming portion 47, the end portion being adjacent to the first support portion 46. A threaded portion 52 is formed on the outer periphery of the second thread forming portion 47. Note that the threaded portion 52 need not be formed all over the outer periphery of the second thread forming portion 47. In FIG. 2, no threaded portion 52 is formed in a region near the step 51, on the outer periphery of the second thread forming portion 47.

The outer periphery of the second support portion 48 is an even peripheral face. The second support portion 48 is slightly smaller in diameter than the second thread forming portion 47. Therefore, a step 53 is formed at an end portion of the second thread forming portion 47, the end portion being adjacent to the second support portion 48. The threaded shaft 40 is partially accommodated in the housing 7 in a state where the threaded shaft 40 is passed through the first end opening 20 and the second end opening 21 of the housing 7. In addition, the threaded shaft 40 is partially accommodated in the holder 27 in a state where the threaded shaft 40 is passed through the opening 30 and the shaft insertion hole 32 inside the housing 7. At this time, the threaded shaft 40 is coaxial with each of the housing 7 and the holder 27. Therefore, the axial direction of the threaded shaft 40 (rotary shaft 6) is the same as the above-described axial direction J.

In the threaded shaft 40, a major portion (portion other than an end portion on the first support portion 46 side) of the first thread forming portion 45 protrudes from the first end opening 20 to the outside of the housing 7. The threaded shaft 40 is connected to the rotary shaft 6. The first support portion 46 is fitted to the inner periphery of the above-described bearing 26. An annular positioning nut 54 is screwed to the threaded portion 49 of the first thread forming portion 45 from the radially outer side. The positioning nut 54 is in contact with the bearing 26 from the outer side of the housing 7. The positioning nut 54 may be regarded as part of the threaded shaft 40. The bearing 26 is positioned with respect to the threaded shaft 40 by being held by the positioning nut 54 and the step 51 from respective sides in the axial direction J.

In the threaded shaft 40, the second thread forming portion 47 is arranged in a region (referred to as "detection region") X between the flange 22 and the end wall 29 of the holder 27 in the hollow portion of the housing 7. The second support portion 48 is arranged in the hollow portion of the holder 27. An end portion of the second support portion 48, which is on the second thread forming portion 47 side, is fitted to the inner periphery of the above-described bearing 34. The bearing 34 is positioned with respect to the threaded shaft 40 by being held by the step 53 of the second thread forming portion 47, which is on the second support portion 48 side, and the positioning protrusion 33 of the end wall 29 of the holder 27 from respective sides in the axial direction J.

The threaded shaft 40 is rotatably supported by the housing (including the holder 27) at two portions in the axial direction J, at which the bearing 26 and the bearing 34 are positioned. Because the threaded shaft 40 is connected to the operation member 2 via the rotary shaft 6, the rotation direction (see the long dashed short dashed line in FIG. 2) of the threaded shaft 40 is the same as the steering direction of the operation member 2. That is, the threaded shaft 40 is rotatable in the steering direction of the operation member 2. The steering angle θ (see FIG. 1) of the operation member 2 is equal to the rotation angle of the threaded shaft 40.

The above-described reaction force generation unit 10 will be described before describing the nut 41, the nut guides 42, the stoppers 43 and the force detection sensor 44. The reaction force generation unit 10 is accommodated in the holder 27. The reaction force generation unit 10 includes an annular plug 61, an annular rubbing ring 62, an annular pressing ring 63 and a spring 64. The plug 61 surrounds the second support portion 48 of the threaded shaft 40 in a non-contact state. The rubbing ring 62 is fitted onto the second support portion 48, at a position closer to the end wall 29 than the plug 61. The pressing ring 63 is fitted onto the rubbing ring 62. The spring 64 is interposed between the plug 61 and the pressing ring 63 in a compressed state.

A threaded portion 65 is formed on the outer periphery of the plug 61, and the threaded portion 65 is screwed to the threaded portion 31 of the holder 27 from the radially inner side. An outer periphery 62A of the rubbing ring 62 and an inner periphery 63A of the pressing ring 63 both are conical surfaces that increase in diameter in a direction away from the plug 61 (rightward in FIG. 2), and are in surface contact with each other. The pressing ring 63 is urged by the spring 64 in a direction away from the plug 61, and presses the rubbing ring 62 radially inward, at its inner periphery 63A. Thus, as indicated by the wide line arrows, the rubbing ring 62 is reduced in diameter, and an inner periphery 62B of the rubbing ring 62 is pressed against the second support portion 48 of the threaded shaft 40. When the threaded shaft 40 is rotated due to a steering operation of the operation member 2, friction between the second support portion 48 and the inner periphery 62B of the rubbing ring 62 is applied to the operation member 2 as the above-described steering reaction force. When the plug 61 is screwed in toward the pressing ring 63, the urging force of the spring 64 increases. Accordingly, friction between the second support portion 48 and the inner periphery 62B of the rubbing ring 62 increases, and steering reaction force also increases. In this way, it is possible to adjust the steering reaction force on the basis of the screw-in amount of the plug 61.

The nut 41 is an annular member. In FIG. 2, for the sake of easy illustration, a portion corresponding to the cross section of the nut 41 is indicated by the positive-slope hatching. A threaded portion 55 is formed in the inner periphery of the nut 41. A round insertion hole 56 is formed in the nut 41. The insertion hole 56 passes through the nut 41 in its axial direction (thickness direction). A single insertion hole 56 or a plurality of (two in the present embodiment) insertion holes 56 is formed. When a plurality of the insertion holes 56 is formed, the insertion holes 56 are formed at equal intervals in the circumferential direction (see FIG. 3). The nut 41 is arranged in the above-described detection region X, and is fitted onto the second thread forming portion 47 of the threaded shaft 40. At this time, the threaded portion 55 of the nut 41 is screwed to the threaded portion 52 of the second thread forming portion 47. That is, the nut 41 is screwed to the threaded shaft 40, and is coaxial with the threaded shaft 40. Therefore, the axial direction of the nut 41 coincides with the above-described axial direction J.

Columnar contact protrusions 71 are formed at the same position in the circumferential direction, at outer peripheral portions of respective axial end faces of the nut 41. The contact protrusions 71 protrude outward from the nut 41 in the axial direction. In the present embodiment, a pair of the contact protrusions 71 arranged on respective axial sides are formed at one portion in the circumferential direction of the nut 41 (see FIG. 3). Instead, a pair of the contact protrusions 71 may be formed at each of multiple portions in the circumferential direction. When a pair of the contact protrusions 71 is formed at each of multiple portions, the pairs of contact protrusions 71 are desirably formed at equal intervals in the circumferential direction.

The nut guides 42 are shaft members, and the number of the nut guides 42 is the same as the number (two, in the present embodiment) of the insertion holes 56 of the nut 41. The nut guides 42 are arranged parallel to the second thread forming portion 47 of the threaded shaft 40 in the detection region X, and are passed through the respective insertion holes 56 of the nut 41. That is, each nut guide 42 (more specifically, a portion between both ends) passes through the nut 41 in a corresponding one of the insertion holes 56.

The stoppers 43 each are a plate-like member that is thin in the axial direction J and extends along the radial direction of the housing 7, and are fixed to the inner periphery of the housing 7 in the detection region X. The stoppers 43 extend from the inner periphery toward the second thread forming portion 47 of the threaded shaft 40. The stoppers 43 are provided on respective axial sides of the nut 41. Note that, in FIG. 2, for the sake of easy illustration, a portion that corresponds to the cross section of each stopper 43 is indicated by the negative-slope hatching. In addition, in FIG. 3, for the sake of easy illustration, each nut guide 42 is shown exaggeratingly such that the length of each nut guide 42 is longer than an actual length.

In FIG. 2, the two stoppers 43 located at the same position in the axial direction J (the upper and lower two stoppers 43 on respective sides of the nut 41 in the direction normal to the axial direction J) are integrated with each other as part of an annular member that surrounds the second thread forming portion 47 in a non-contact state (see FIG. 3). Therefore, the thin long plate-like and annular stoppers 43 (see FIG. 3) are provided (two in total) on respective axial sides of the two insertion holes 56 of the nut 41. Only a portion of each of the stoppers 43, the portion being on the opposite side of the stopper 43 from the contact protrusion 71 (lower side in FIG. 2) as viewed from the axial direction J, is fixed to the inner periphery of the housing 7. A region of each stopper 43, other than the above-described portion, is not in contact with the inner periphery of the housing 7.

A mounting portion 72 is integrally formed in each stopper 43 at a location that overlaps with the contact protrusion 71 as viewed from the axial direction J (upper end portion in FIG. 2). As shown in FIG. 3, a pair of cutout grooves 73 is formed in each stopper 43. The cutout grooves 73 extend parallel to each other so as to sandwich a portion that overlaps with the contact protrusion 71 as viewed from the axial direction J. In each stopper 43, the portion sandwiched by the cutout grooves 73 is the mounting portion 72. Each mounting portion 72 has a shape of a small piece that extends along the cutout grooves 73. Each mounting portion 72 has a base end 72A and a distal end 72B. The base end 72A is coupled to the corresponding stopper 43. The distal end 72B is located on the opposite side (upper side in FIG. 2) of the mounting portion 72 from the base end 72A, and is not in contact with the corresponding stopper 43. Each mounting portion 72 is elastically deformable such that the distal end 72B pivots about the base end 72A. More specifically, the mounting portion 72 of each stopper 43 is elastically deformable so as to approach or move away from the nut 41 in the axial direction J. At each mounting portion 72, a recess 75 is formed on the base end 72A side, in a face 72D that is on the opposite side of the mounting portion 72 from a face 72C that faces the nut 41 (see also FIG. 2). Therefore, the thickness of each mounting portion 72 in the axial direction J is smaller on the base end 72A side, on which the recess 75 is formed, than on the distal end 72B side. With this configuration, each mounting portion 72 elastically deforms more easily than that with no recess 75.

Because each mounting portion 72 is part of the corresponding stopper 43, the face 72D that is on the opposite side of the mounting portion 72 from the face 72C that faces the nut 41 is a face on the opposite side of the stopper 43 from a face that faces the nut 41. As shown in FIG. 2, each nut guide 42 passed through the corresponding insertion hole 56 of the nut 41 is fixed to the stoppers 43 that are located on respective sides of the insertion hole 56 in the axial direction J. Therefore, the stoppers 43 are provided at respective ends of each nut guide 42 in the longitudinal direction (the same as the axial direction J), and retain one end portion and the other end portion of each nut guide 42 in the longitudinal direction. Thus, the state where each nut guide 42 is passed through the insertion hole 56 of the nut 41 is maintained.

Each nut guide 42 is passed through the corresponding insertion hole 56 with a slight play. The contact detection sensor 70 includes strain sensors (strain gauges) 74. One strain sensor 74 is provided at each stopper 43. More specifically, one strain sensor 74 is attached to a bottom of the recess 75 of the mounting portion 72 (portion of the mounting portion 72, which is thin and easy to deform) in each stopper 43.

Figure 4:
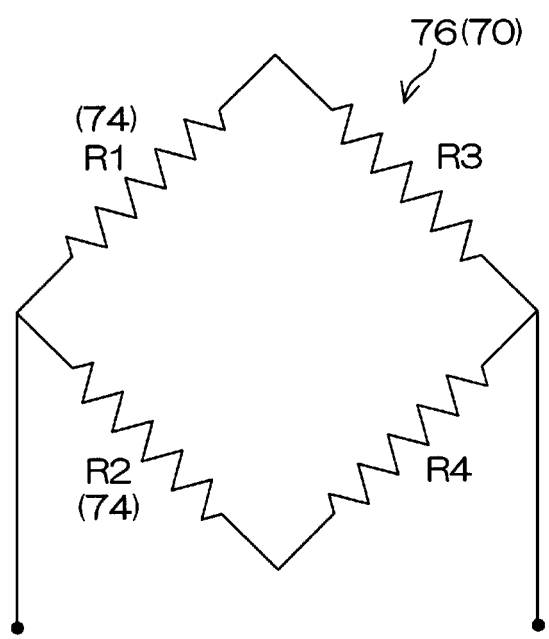
FIG. 4 is an electrical diagram that shows the configuration of a contact detection sensor.

FIG. 4 is an electrical diagram that shows the configuration of the contact detection sensor 70. As shown in FIG. 4, the contact detection sensor 70 includes a bridge circuit 76 that includes resistors R1, R2, R3, R4. In the bridge circuit 76, the resistor R1 and the resistor R3 are connected in series, the resistor R2 and the resistor R4 are connected in series, and a serially-connected portion between the resistor R1 and resistor R3 and a serially-connected portion between the resistor R2 and resistor R4 are connected in parallel. The contact detection sensor 70 that includes the above-described bridge circuit 76 is electrically connected to the control unit 19.

An output electric power E from the bridge circuit 76 is expressed by the following equation. In the following equation, R1, R2, R3, R4 respectively denote resistance values of the corresponding resistors.

$$E=(R1 \cdot R3 - R2 \cdot R4)/(R1+R2) \cdot (R3+R4)$$

In the present embodiment, the strain sensor 74 of one (right side one in FIG. 2) of the stoppers 43 among a pair of the stoppers 43 is the resistor R1, and the strain sensor 74 of the other one (left side one in FIG. 2) of the stoppers 43 is the resistor R2. Only when one of the strain sensors 74 is compressed or pulled, the output electric power E is generated.

As shown in FIG. 2, when the user steers the operation member 2 to rotate the operation member 2 in the clockwise direction or the counterclockwise direction, the rotary shaft 6 and the threaded shaft 40 also rotate together with the operation member 2. At this time, the nut 41 screwed to the threaded shaft 40 attempts to rotate together with the threaded shaft 40. However, the nut 41 is not able to rotate because the nut guides 42 are passed through the respective insertion holes 56 of the nut 41, and the nut 41 slides along the nut guides 42 (in other words, the axial direction J of the threaded shaft 40) (see the long dashed short dashed line arrow) instead of rotating.

That is, the nut guides 42 cause the nut 41 to move in the axial direction J of the threaded shaft 40 as the threaded shaft 40 rotates.

For example, when the user rotates the operation member 2 (in other words, the threaded shaft 40) in the clockwise direction in FIG. 2, the nut 41 slides along the nut guides 42 in a direction toward the operation member 2 (rightward in FIG. 2). When the operation member 2 is continuously rotated in the same direction and, finally, the nut 41 contacts the stopper 43 which is closest to the operation member 2 (on the right side in FIG. 2), the nut 41 is not able to slide any more. Thus, the operation member 2 is not allowed to be rotated in the same direction (clockwise direction) any more. That is, the stopper 43 prevents movement of the nut 41 in the axial direction J (rightward in FIG. 2) beyond a predetermined position at which the nut 41 contacts the stopper 43. At the time when the nut 41 contacts the stopper 43, the contact protrusion 71 of the nut 41, which is located on the stopper 43 side (right side in FIG. 2), contacts the mounting portion 72 of the stopper 43. As a result, the mounting portion 72 elastically deforms in a direction away from the nut 41. In response to this, the amount of strain in the strain sensor 74 (resistor R1) attached to the mounting portion 72 exceeds a predetermined threshold, the resistance value of the resistor R1 increases, and the above-described output electric power E increases to a positive value.

On the other hand, when the user rotates the operation member 2 in the counterclockwise direction in FIG. 2, the nut 41 slides in a direction away from the operation member 2 (leftward in FIG. 2) along the nut guides 42. When the operation member 2 is continuously rotated in the same direction and, finally, the nut 41 contacts the stopper 43 which is farthest from the operation member 2 (on the left side in FIG. 2), the nut 41 is not able to slide any more. Thus, the operation member 2 is not allowed to be rotated in the same direction (counterclockwise direction). That is, the stopper 43 prevents movement of the nut 41 in the axial direction J (leftward in FIG. 2) beyond a predetermined position at which the nut 41 contacts the stopper 43. At the time when the nut 41 contacts the stopper 43, the contact protrusion 71 of the nut 41, which is located on the stopper 43 side (left side in FIG. 2), contacts the mounting portion 72 of the stopper 43. As a result, the mounting portion 72 elastically deforms in a direction away from the nut 41. In response to this, the amount of strain in the strain sensor 74 (resistor R2) attached to the mounting portion 72 exceeds a predetermined threshold, the resistance value of the resistor R2 increases, and the above-described output electric power E decreases to a negative value.

In this way, the contact detection sensor 70 that includes the strain sensors 74 detects contact between the stopper 43 and the nut 41 (in other words, a steering end of the operation member 2) on the basis of the fact that the amount of strain in the strain sensor 74 (resistor R1 or R2) exceeds the predetermined threshold. When one of the contact protrusions 71 of the nut 41 contacts the corresponding stopper 43, the mounting portion 72 is significantly deflected relatively in the stopper 43. Therefore, the strain sensors 74 (contact detection sensor 70) respectively attached to the mounting portions 72 are able to highly accurately detect contact between the stopper 43 and the nut 41 on the basis of the deflection of the mounting portion 72. In addition, it is possible to damp a shock at the time of contact (steering end) through deflection (elastic deformation) of the mounting portion 72, which is caused when the nut 41 contacts the stopper 43. As a result, it is possible to improve the operability of the operation member 2 for a user. Each strain sensor 74 is provided on the face 72D that does not face the nut 41. Therefore, at the time when the nut 41 contacts the stopper 43, it is possible to prevent a collision of the nut 41 with the corresponding strain sensor 74. Therefore, it is possible to prevent a malfunction of each strain sensor 74.

The amount of strain in one of the strain sensors 74 (the resistors R1 and R2) and the output electric power E detected by the contact detection sensor 70 are input into the control unit 19 (see FIG. 1). In the case where the amount of strain in one of the strain sensors 74 (the resistors R1 and R2) exceeds the predetermined threshold, the control unit 19 determines the steering direction of the operation member 2 on the basis of the output electric power E input into the control unit 19. When the output electric power E is a positive value, the control unit 19 determines that the steering direction of the operation member 2 is the clockwise direction in FIG. 2. When the output electric power E is a negative value, the control unit 19 determines that the steering direction of the operation member 2 is the counterclockwise direction in FIG. 2. In this way, not only the steering angle θ (see FIG. 1) detected by the steering angle sensor 8 but also the output electric power E (the steering direction of the operation member 2) detected by the contact detection sensor 70 is input into the control unit 19.

As shown in FIG. 1, for example, when a malfunction occurs in the steering angle sensor 8, a detection result (steering angle θ) from the steering angle sensor 8 is not input into the control unit 19. In this case, the control unit 19 acquires the steering direction in which the operation member 2 is operated by the user on the basis of the output electric power E input from the contact detection sensor 70 of the steering direction detection unit 11. When the output electric power E is a positive value (when the steering direction of the operation member 2 is the clockwise direction), drive control is executed on the steered system actuator 17 such that the wheels 4 are steered to the right by a predetermined angle and at a predetermined speed within a period during which the output electric power E is a positive value or within a predetermined period from when the output electric power E becomes a positive value. On the other hand, when the output electric power E is a negative value (when the steering direction of the operation member 2 is the counterclockwise direction), drive control is executed on the steered system actuator 17 such that the wheels 4 are steered to the left by a predetermined angle and at a predetermined speed within a period during which the output electric power E is a negative value or within a predetermined period from when the output electric power E becomes a negative value.

As described above, in the steer-by-wire steering system 1, it is possible not only to detect the steering angle θ of the operation member 2 with the use of the steering angle sensor 8 but also to detect the steering direction of the operation member 2 with the use of the steering direction detection unit 11. Therefore, even if a malfunction occurs in the steering angle sensor 8, the steered mechanism 5 is able to steer the wheels 4 on the basis of the steering direction detected by the steering direction detection unit 11 that serves as a fail-safe mechanism. That is, the steering system 1 allows at least continuation of steering even if a malfunction occurs in the steering angle sensor 8, although the accuracy is lower than that when the steering angle sensor 8 is operating normally.

The steering direction detection unit 11 that detects only the steering direction has a simpler configuration than that of the steering angle sensor 8 that detects the steering angle θ (both the steering direction and steering amount) of the operation member 2. By using the thus-configured steering direction detection unit 11, it is possible to suppress increases in the number of components and the cost in comparison with the case where the steering angle sensor 8 is additionally provided instead of the steering direction detection unit 11. That is, the configuration that allows continuation of steering even if a malfunction occurs in the steering angle sensor 8 is implemented without increases in the number of components and the cost, and it is possible to ensure the redundancy of the steering system 1.

In addition, as shown in FIG. 2, the steering direction detection unit 11 has a low-cost and simple configuration that includes the threaded shaft 40, the nut 41, the nut guides 42, the stoppers 43 and the contact detection sensor 70. The steering direction detection unit 11 is able to detect the steering direction of the operation member 2 on the basis of the fact that the nut 41 moves along the axial direction J of the threaded shaft 40 in accordance with a steering operation of the operation member 2 (rotation of the threaded shaft 40) and then contacts the stopper 43. By using the thus-configured steering direction detection unit 11, it is possible to implement the configuration that allows continuation of steering even if a malfunction occurs in the steering angle sensor 8, while further reliably avoiding increases in the number of components and the cost. Particularly, even when the steering direction detection unit 11 is added to the existing operation mechanism 3, it is possible to avoid a significant design change in the operation mechanism 3. Therefore, it is possible to reliably avoid increases in the number of components and the cost.

Because it is possible to simply form the contact detection sensor 70 from the strain sensors 74, it is possible to implement the configuration that allows continuation of steering even when an abnormality occurs in the steering angle sensor 8, while further reliably avoiding increases in the number of components and the cost. The invention is not limited to the above-described embodiment and various modifications may be made within the scope of the appended claims.

For example, in the above-described embodiment, the stoppers 43 are provided at both end portions of each nut guide 42 in the longitudinal direction. Therefore, the steering direction detection unit 11 is able to detect each of the steering directions, that is, the clockwise direction and counterclockwise direction of the operation member 2 (see FIG. 2). However, if it is necessary to detect only one of the steering directions, the stopper 43 need to be provided at only the first end portion or the second end portion of each nut guide 42 in the longitudinal direction.

A pressure-sensitive sensor formed of a piezoelectric element, or the like, or a proximity sensor may be used as the contact detection sensor 70 instead of the strain sensors 74. Alternatively, a switch that is provided at each stopper 43 and that turns on when it contacts the nut 41 may be used as the contact detection sensor 70. When the switches are used, the control unit 19 (see FIG. 1) determines the steering direction of the operation member 2 on the basis of which one of the switches at the right and left stoppers 43 in FIG. 2 turns on.

The contact detection sensor 70 may be provided not at the stoppers 43 but at portions on respective axial end faces of the nut 41, which contact the stoppers 43.

What is claimed is:

1. A steering system, comprising:
an operation mechanism that includes an operation member used to perform a steering operation; and
a steered mechanism that is not mechanically coupled to the operation mechanism, and that steers a wheel based on the steering operation of the operation member, wherein
the operation mechanism includes a steering angle sensor that detects a steering angle of the operation member, and a steering direction detection unit that detects only a steering direction of the operation member, the steering direction detection unit including:
a threaded shaft that is rotatable in the steering direction of the operation member;
a nut that is screwed to the threaded shaft;
a nut guide that is arranged parallel to the threaded shaft, and that causes the nut to move in an axial direction of the threaded shaft in accordance with rotation of the threaded shaft;
a stopper that is provided at at least one end portion of the nut guide in a longitudinal direction of the nut guide, and that prevents movement of the nut in the axial direction beyond a predetermined position; and
a contact detection unit that detects a contact between the stopper and the nut.

2. The steering system according to claim 1, wherein the contact detection unit includes a strain sensor that is provided at the stopper, and that detects a contact between the stopper and the nut.

3. The steering system according to claim 2, further comprising a contact protrusion that protrudes from the nut and that contacts the stopper.

4. The steering system according to claim 2, wherein the strain sensor is provided on one face of the stopper, the one face being on an opposite side of the stopper from the other face the stopper, the other face facing the nut.

5. The steering system according to claim 3, wherein the strain sensor is provided on one face of the stopper, the one face being on an opposite side of the stopper from the other face the stopper, the other face facing the nut.

6. The steering system according to claim 2, further comprising an elastically deformable mounting portion which is provided in the stopper and to which the strain sensor is attached.

7. The steering system according to claim 3, further comprising an elastically deformable mounting portion which is provided in the stopper and to which the strain sensor is attached.

8. The steering system according to claim 4, further comprising an elastically deformable mounting portion which is provided in the stopper and to which the strain sensor is attached.

9. The steering system according to claim 5, further comprising an elastically deformable mounting portion which is provided in the stopper and to which the strain sensor is attached.

* * * * *